Patented Jan. 16, 1940

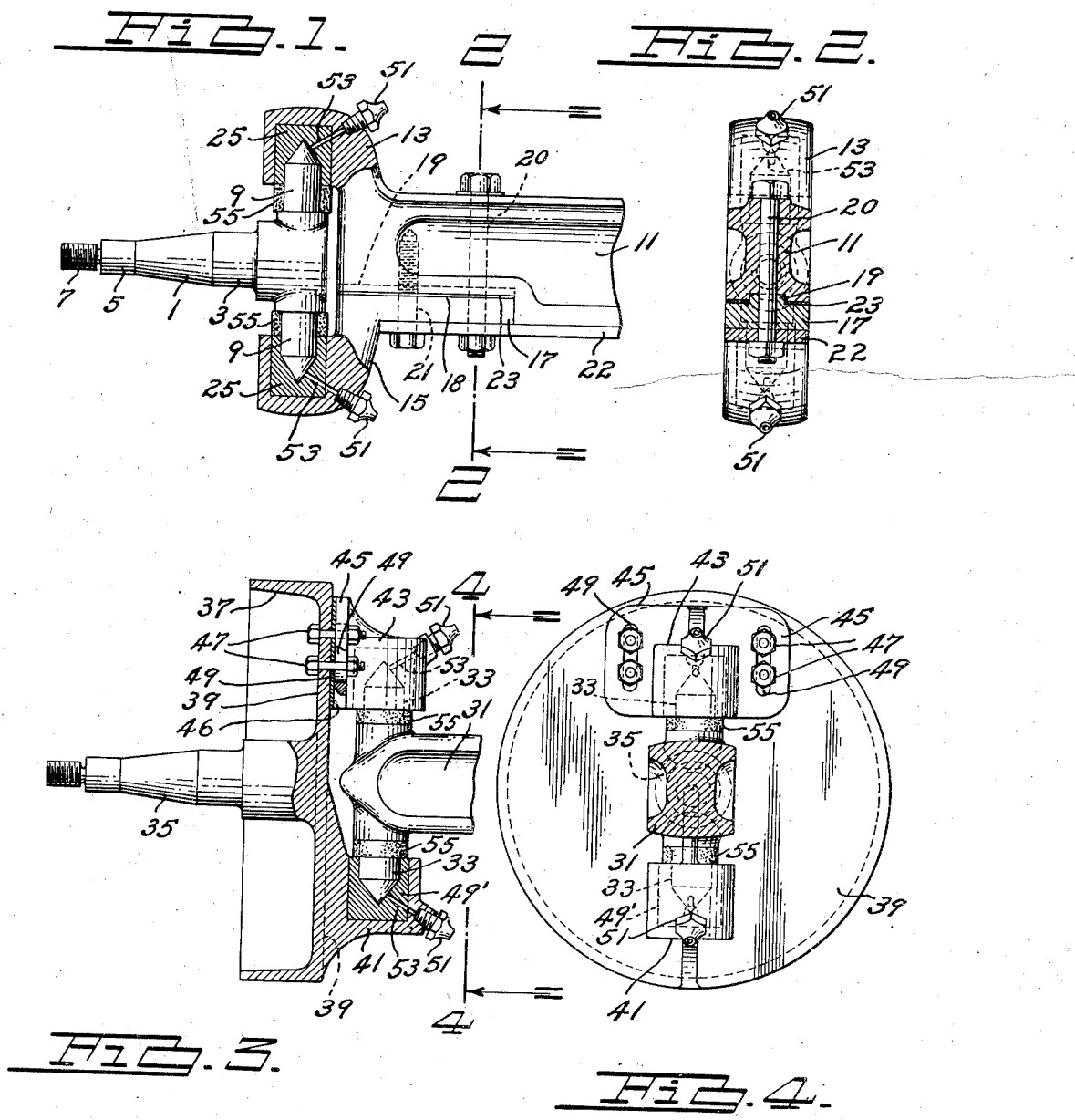

2,187,249

UNITED STATES PATENT OFFICE 2,187,249

FRONT AXLE AND WHEEL SPINDLE

Frederick M. Schatz, Detroit, Mich., assignor of one-seventh to Herman Strube, Detroit, Mich.; one-seventh to Herbert Strube, one-seventh to William Strube, one-seventh to Charles Strube, one-seventh to Sheldon Griffin, and one-seventh to William A. Sirr, all of Ferndale, Mich.

Application September 1, 1937, Serial No. 161,883

3 Claims. (Cl. 280—96.1)

The invention pertains to an improved front axle assembly for vehicles, and more particularly to an improved bearing arrangement for journalling the front wheel spindles in the ends of the front axle.

It is an object of my invention to provide an improved front axle assembly for vehicles comprising adjustable bearing means for journalling the front wheel spindles with a minimum of friction and slack motion and for convenience in taking up both the side play and the end play.

It is also an object of my invention to provide an improved front axle assembly for vehicles comprising, a front axle, a front wheel spindle, tapered pivot pins or trunnions projecting in opposed relation from the front wheel spindle, a bearing arm projecting permanently from the axle, a second bearing arm separate from the axle, means for clamping the second bearing arm to project from the axle in spaced relation from the first, removable shims clamped by the second bearing arm for regulating its spaced relation, and tapered bearing apertures in the spaced bearing arms for journalling the tapered ends of the trunnions and for limiting both the side play and also the end play thereof.

It is a further object of my invention to provide in such a front axle assembly a safety strap extending along the front axle and having its ends secured by the clamping means which clamps a bearing arm to the axle at each end thereof.

Another object of my invention is to provide an improved front axle assembly which comprises a pair of tapered trunnions projecting in opposed relation from an end of the front axle, a front wheel spindle carrying a pair of spaced bearing arms of which one is secured permanently to the spindle and the other is secured adjustably for adjustable spacing, and tapered bearing apertures in the spaced bearing arms for journalling the tapered ends of the trunnions whereby both the side play and the end play may be adjusted conveniently and simultaneously to compensate for wear and to provide the optimum adjustment for minimum friction and vibration.

Further objects and advantages are within the scope of my invention such as relate to the arrangement and function of the related elements, to various details of construction and to combinations of parts, elements per se, and to economies of manufacture and numerous other advantages as will be apparent from a consideration of the specification in conjunction with the drawing, in which:

Fig. 1 is a side elevational view partially broken away and sectioned to show one end of an improved front axle assembly arranged in accordance with one embodiment of my invention;

Fig. 2 is a cross-sectional view taken on line 2—2 thereof;

Fig. 3 is a side elevational view partially broken away and sectioned to show another embodiment of my invention, and Fig. 4 is a cross-sectional view taken on line 4—4 thereof.

Referring more particularly to Figs. 1 and 2 of my drawing, my improved front axle and spindle assembly comprises a front wheel spindle 1 of tapered frusto-conical conformation, having a large cylindrical portion 3 for receiving the inner race of a suitable ball bearing (not shown) which is pressed thereon in suitable snug fitting relation to prevent relative rotation, in a well known manner. At its outer or smaller end, the tapered front wheel spindle 1 has a smaller cylindrical portion 5 for receiving the inner race of a second ball bearing (not shown). At its outer end the front wheel spindle terminates in a screw threaded shank 7 to receive a threaded nut for securing a wheel (not shown) which is supported on the bearings in the usual manner.

In accordance with my invention I provide a pair of trunnions or pivot shafts 9 which extend from the large or inner end of the front wheel spindle 1 in opposed relation. The trunnions 9 may be formed integrally with the front wheel spindle or separately mounted therein in any suitable manner. To provide suitable bearing surfaces on the trunnions 9, the outer ends thereof are of a convex conformation, and for this purpose the outer ends are preferably tapered, as shown.

An axle 11, which is the front axle of a vehicle, carries a bearing arm 13 extending angularly and projecting outwardly. The bearing arm 13 is in permanent connection with the axle 11, as by being integral therewith or permanently secured thereon.

A second bearing arm 15 is provided in separate relation from the front axle 11 and it comprises a base plate 17. In the under side of the axle 11 and adjacent the end thereof I provide an open or cut away portion 18 which comprises a seat for receiving the base plate 17 to extend and rigidly support the second bearing arm 15 in spaced relation from the first bearing arm 13. On the upper face of the base plate 17 a flange or step seat 19 is provided which fits snugly into a corresponding groove in the axle to ensure that the base plate 17 is fitted accurately onto the axle and to secure it rigidly in the proper position.

The base plate 17 is clamped firmly on the axle 11 to project the second bearing arm 15 in proper spaced relation from the first bearing arm by suitable clamping means such as a bolt 20 passing vertically through suitable aligned apertures in the axle 11, and the base plate 17. To more securely clamp the base plate 17 a screw 21 is also passed through the base plate 17 into a suitable threaded aperture in the axle 11. I also provide a safety strap 22 extending along under the axle 11 and having its ends clamped by bolts 20 and 21. In case of a broken axle the safety strap 22 holds the parts together, and at all times it serves to support the base plate 17.

To accurately and adjustably determine the spaced relation of the bearing arms 13 and 15, thin shims 23 are clamped between the base plate 17 and the axle. For this purpose thin layers of any suitable sheet metal or other material are used and these are preferably in the form of U-shaped layers which can be conveniently removed uniformly from both sides.

For journalling the ends of the trunnions 9, I provide bearings 25 having tapered bearing apertures of suitable conformation for receiving the tapered bearing surfaces provided on the ends of the oppositely directed trunnions. For this purpose I preferably provide for bearing blocks 25 which comprise inserts of suitable bearing material which are pressed into apertures in the spaced bearing arms 13 and 15. The bearing blocks are preferably made of pieces of metal which have been hardened in any suitable manner.

The cooperative bearing surfaces between the spaced bearings and the adjacent trunnions are of any suitable conformation for adjusting both the side play and the end play of the trunnions simultaneously by removing shims 23 and pinching the bearings 25 together onto the ends of the trunnions. Although for clearness only one end of the front axle assembly is shown, it will be understood, that a front wheel spindle is similarly journalled at each end of the front axle.

In accordance with my invention, this adjustment and compensation for wear may be accomplished quickly and conveniently without removing the wheel spindle and frequently without the necessity of lifting the weight of the vehicle from the wheel. It is only necessary to loosen the bolt 20 and screw 21 to remove one of the shims 23. The bolt and screw are then tightened up. This is repeated until the slack motion between the trunnions and the bearings has been taken up without creating excessive friction, whereby substantially friction free operation is obtained.

In accordance with another embodiment of my invention, which is preferable on vehicles having four-wheel brakes, a front axle 31 of simple construction is utilized having trunnions 33 projecting oppositely from the end thereof, as shown in Figs. 3 and 4. The trunnions 33 may be integral with the front axle 31, or they may be separate members permanently mounted therein in any suitable manner. The outer ends of the trunnions 33 are tapered to provide bearing surfaces thereon. It will be understood that both ends of the front axle 31 are similarly formed for mounting both of the front wheel spindles, only one being shown for clearness.

The front wheel spindle 35 carries a brake drum 37 supported on a disk 39 on the inner end thereof. For pivotally receiving the end of the axle, a bearing arm 41 is provided projecting inwardly from the disk 39 on which it is integral or permanently attached, as shown.

A second bearing arm 43 is provided which is separable from the structure of the front wheel spindle. The second bearing arm 43 is provided with laterally projecting lugs 45 which are secured to the disk 39 by bolts 47 passing through suitable holes in the disk and slots 49 in the lugs. A sheet 46 of metal or other material of suitable thickness may be provided under the lugs 45 to space the bearing arm 43, for properly inclining the front wheels of the vehicles.

Each of the bearing arms 41 and 43 has a bearing insert 49' of suitable hardened bearing metal pressed or otherwise secured in suitable apertures in the bearing arms. The bearing inserts are provided with concave or tapered bearing apertures of suitable conformation for journalling the convex or tapered trunnions 33.

For adjusting the clearance to compensate for wear and take up slack motion in this embodiment of my invention it is only necessary to loosen the bolts 47 sufficiently to permit movement of the bearing arm 43 toward the bearing arm 41 as by lightly hammering or tapping it. The bolts 47 are then tightened to hold the bearings in properly spaced positions.

In both embodiments of my invention, lubrication is preferably provided by forcing grease under pressure through grease fixtures 51 which may be of any well known type such as those which are known in the trade as Zerk or Alemite fittings. Such fittings are secured in threaded apertures in the bearing arms and connect through suitable apertures 53 into the bearing apertures in the bearing blocks 25 and 49', as shown. For retaining grease and excluding dust, felt washers 55 are provided snugly around the trunnions adjacent the bearing blocks 25 or 49'.

It is apparent that within the scope of my invention, modifications and different arrangements may be made other than herein disclosed, and the present disclosure is illustrative merely, the invention comprehending all variations thereof.

I claim:

1. In a front axle assembly for vehicles the combination of, a front axle, a front wheel spindle, trunnions projecting from said spindle in opposed relation, the ends of said trunnions being tapered to provide bearing surfaces, a bearing arm projecting permanently from said axle, a second bearing arm separate from said axle, tapered bearing apertures in said bearing arms for journalling the tapered ends of said trunnions and adjusting the slack motion thereof, bolt clamping means securing said second bearing arm to said axle to project therefrom in spaced relation from the first bearing arm, removable shims between said second bearing arm and the axle to regulate the spaced relation between the bearing apertures in the arms for adjusting the side play and the end play of said trunnions, and a safety strap extending along said axle with one end secured by said bolt clamping means.

2. In a front axle assembly for vehicles the combination of, a front axle, a front wheel spindle, trunnions projecting from said spindle in spaced relation, the ends of said trunnions presenting bearing surfaces, a bearing arm projecting permanently from said axle, a second bearing arm separate from said axle, a base plate on said second arm, an open portion in said axle to provide a seat for receiving said base plate to extend the second bearing arm in spaced relation from the first bearing arm, bearing apertures in said bearing arms for journalling the ends of said trunnions, the bearing surfaces on the ends of said trunnions being of convex conformation and the bearing apertures in said arms having concave surfaces of suitable conformation for adjusting both the side play and the end play of said trunnions in accordance with the adjusted spaced relation of the bearings, shims between said base plate and said axle, and means for clamping said base plate firmly toward said axle against said shims.

3. A combination according to claim 1 wherein the second bearing arm has a base plate extending therefrom, the front axle having an open portion in the under side forming a seat for receiving said base plate, and cooperative interlocking means on the engaging surfaces of said base plate and said seat for providing and maintaining accurate alignment of the base plate when it is clamped on the axle by the bolt clamping means.

FREDERICK M. SCHATZ.